(12) United States Patent
Qin et al.

(10) Patent No.: US 10,552,593 B2
(45) Date of Patent: Feb. 4, 2020

(54) FACE VERIFICATION METHOD AND ELECTRONIC DEVICE

(71) Applicant: HUAWEI TECHNOLOGIES CO., LTD., Shenzhen, Guangdong (CN)

(72) Inventors: Chao Qin, Beijing (CN); Zhuo Wei, Singapore (SG); Shunan Fan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 63 days.

(21) Appl. No.: 15/771,300

(22) PCT Filed: Oct. 31, 2015

(86) PCT No.: PCT/CN2015/093528
§ 371 (c)(1),
(2) Date: Apr. 26, 2018

(87) PCT Pub. No.: WO2017/070971
PCT Pub. Date: May 4, 2017

(65) Prior Publication Data
US 2018/0314812 A1    Nov. 1, 2018

(51) Int. Cl.
*G06F 21/32* (2013.01)
*G06K 9/00* (2006.01)

(52) U.S. Cl.
CPC ......... *G06F 21/32* (2013.01); *G06K 9/00281* (2013.01); *G06K 9/00288* (2013.01); *G06K 9/00302* (2013.01)

(58) Field of Classification Search
USPC ........................................................ 713/186
See application file for complete search history.

(56) References Cited

U.S. PATENT DOCUMENTS

| 6,625,303 | B1 * | 9/2003 | Young | G06T 7/70 |
| | | | | 382/132 |
| 8,457,367 | B1 * | 6/2013 | Sipe | G06K 9/00221 |
| | | | | 382/118 |

(Continued)

FOREIGN PATENT DOCUMENTS

| CN | 101710383 A | 5/2010 |
| CN | 101908140 A | 12/2010 |

(Continued)

OTHER PUBLICATIONS

NPL—Facial Expression-1 (Year: 2002).*

(Continued)

*Primary Examiner* — Taghi T Arani
*Assistant Examiner* — Badri Narayanan Champakesan
(74) *Attorney, Agent, or Firm* — Fish & Richardson P.C.

(57) ABSTRACT

An electronic device displays one or more pieces of content on a display screen. k face images are obtained by using a camera during display of the content. t facial expression parameter values are determined according to the obtained k face images. If a matching degree of the t facial expression parameter values and a first preset reference sequence is not less than a first preset threshold, and if face matching according to at least one of the obtained k face images succeeds, determine that a face verification result is success.

20 Claims, 9 Drawing Sheets

(56) References Cited

U.S. PATENT DOCUMENTS

| | | | | |
|---|---|---|---|---|
| 8,856,541 | B1* | 10/2014 | Chaudhury | G06F 21/32 382/115 |
| 9,082,235 | B2* | 7/2015 | Lau | G07C 9/00 |
| 9,547,763 | B1* | 1/2017 | Avital | G06F 21/36 |
| 2004/0091137 | A1* | 5/2004 | Yoon | G06K 9/00268 382/118 |
| 2009/0207251 | A1 | 8/2009 | Kobayashi et al. | |
| 2013/0015946 | A1* | 1/2013 | Lau | G07C 9/00 340/5.2 |
| 2013/0022243 | A1 | 1/2013 | Xu et al. | |
| 2013/0051770 | A1* | 2/2013 | Sargent | H04N 21/23418 386/278 |
| 2013/0188840 | A1 | 7/2013 | Ma et al. | |
| 2015/0154392 | A1* | 6/2015 | Bao | G06F 21/32 726/19 |
| 2015/0244719 | A1* | 8/2015 | Sampathkumaran | H04L 9/3231 726/5 |
| 2017/0118207 | A1* | 4/2017 | Madhu | H04L 63/0861 |

FOREIGN PATENT DOCUMENTS

| | | |
|---|---|---|
| CN | 102385703 A | 3/2012 |
| CN | 103440479 A | 12/2013 |
| CN | 103678984 A | 3/2014 |
| CN | 103778360 A | 5/2014 |
| CN | 103824089 A | 5/2014 |
| CN | 104348778 A | 2/2015 |
| CN | 104361326 A | 2/2015 |
| CN | 104683302 A | 6/2015 |
| CN | 104751110 A | 7/2015 |
| CN | 104834900 A | 8/2015 |
| EP | 2680192 A2 | 1/2014 |
| JP | 2003233816 A | 8/2003 |
| JP | 2005040591 A | 2/2005 |
| JP | 2006133930 A | 5/2006 |
| JP | 2006235718 A | 9/2006 |
| JP | 2008033681 A | 2/2008 |
| JP | 2008191743 A | 8/2008 |
| JP | 2010182056 A | 8/2010 |
| KR | 20130028734 A | 3/2013 |
| WO | 2014003978 A1 | 1/2014 |

OTHER PUBLICATIONS

NPL—Facial Expression-2 (Year: 2013).*
NPL—Facial Expression-3 (Year: 2005).*
Nahid Ferdous et al.,"Using Pupil Size as an Indicator for Task Difficulty in Data Visualization" IEEE Vis,dated 2014, total 2 pages.
Anonymous,"Comment: Commercial vein sensor spoofed—so what?" dated Oct. 17, 2014,total 3 pages Retrieved from website http://www.planetbiometrics.com/article-details/i/2181/desc/comment-commercial-vein-sensor-spoofed--so-what/.
Tabula Rasa,"Spoofing Near-Infrared Face Recognition,"dated Oct. 21, 2013,total 4 pages Retrieved from website https://www.youtube.com/watch?v=kGE1YMuCSj0.

Chen Gen, "Face recognition ATM came: Is this technology really reliable?" Sina,dated Jun. 1, 2015,total 6 pages.
Mariska E. Kret et al.,"Emotional signals from faces, bodies and scenes influence observers" face expressions, fixations and pupil-size,Front Hum Neurosci,dated Dec. 18, 2013,total 25 pages.
Mariska E. Kret et al.,"Perception of face and body expressions using electromyography, pupillometry and gaze measures" dated Feb. 8, 2013,total 18 pages.
Hugo D. Critchley,"Psychophysiology of neural, cognitive and affective integration: fMRland autonomic indicants" International Journal of Psychophysiology,dated 2009,total 7 pages.
Joss Fong,"Eye-Opener: Why Do Pupils Dilate in Response to Emotional States?" Socientific American,dated Dec. 7, 2012,total 11 pages.
Joss Fong,"The Meaning of Pupil Dilation" The Scientist,dated Dec. 6, 2012,total 5 pages.
Elena Geangu et al.,"Infant Pupil Diameter Changes in Response to Others" Positive and Negative EmotionsPLOS, dated Nov. 16, 2011,total 11 pages.
R Supriyanti et al.,"Detecting Pupil and Iris under Uncontrolled Illumination using Fixed-Hough Circle Transform" International Journal of Signal Processing,dated Dec. 2012,total 14 pages.
H Mehrabian et al.,"Pupil boundary detection for iris recognition using graph cuts" Tari,dated Dec. 2007,total pages.
Scott Zamost,"Exclusive: Man in disguise boards international flight," dated Nov. 5, 2010,total 2 pages Retrieved from website http://www.cnn.com/2010/WORLD/americas/11/04/canada.disguised.passenger/.
Nguyen Minh Duc et al.,"Your face is Not your password Face Authentication ByPassingLenovo—Asus—Toshiba" Black Hat Briefings,dated 2009,total 16 pages.
Andy Greenberg,"German Hacker Group Says It's Broken the iPhone"s TouchID Fingerprint Reader," dated Sep. 22, 2013,total 4 pages Retrieved from website http://www.forbes.com/sites/andygreenberg/2013/09/22/german-hackers-say-theyve-broken-the-iphones-touchid-fingerprint-reader/.
International Search Report issued in International Application No. PCT/CN2015/093528 dated Mar. 31, 2018, 14 pages.
XP055126132 Arman Boehm et al.,"SAFE: Secure Authentication with Face and Eyes",IEEE Prisms 2013,dated Jun. 27, 2013,total 8 pages.
Extended European Search Report issued in European Application No. 15907032.5 dated Jun. 28, 2018, 6 pages.
CN Office Action in Chinese Appln No. 201580042704.8, dated Apr. 3, 2019, 19 pages (with English translation).
Office Action issued in Japanese Application No. 2018-522045 dated Jul. 8, 2019, 9 pages (with English translation).
Tanaka et al., "Dynamics Analysis of Facial Expression Changes for Personal Identification," The Institute of Electrical Engineers of Japan, Paper C, vol. 130 No. 11, Division of Electronics, Information, and Systems, ISSN 0385-4221, pp. 2047-2057.
Qinghong et al.,"Electronic Payment and Settlement (3rd Edition)", Mar. 1, 2019, 10 pages (With English Abstract).
Office Action issued in Chinese Application No. 201580042704.8, dated Nov. 5, 2019, 8 pages.
Office Action issued in Korean Application No. 2018-7013743 dated Nov. 12, 2019, 3 pages (with English translation).

* cited by examiner

FACE VERIFICATION METHOD AND ELECTRONIC DEVICE

CROSS-REFERENCE TO RELATED APPLICATIONS

This application is a national stage of International Application No. PCT/CN2015/093528, filed Oct. 31, 2015, which is incorporated by reference herein in its entirety.

TECHNICAL FIELD

The present invention relates to the field of information processing technologies, and in particular, to a face verification method and an electronic device.

BACKGROUND

As face matching accuracy continuously increases, face matching technologies have been widely applied in many fields. A general face matching process includes: first capturing a face image, extracting a feature from the face image, and marking the feature as a face image template; and during face recognition, extracting a feature of a to-be-recognized face by using a same method, matching the feature against the face image template, and determining a recognition result according to matching reliability. A difficulty in face matching is living body verification. If no living body verification is performed, face matching is easily attacked by using a face image obtained from a photo or obtained by 3D printing or another technology.

In the prior art, a living body verification method, such as face unlock on an Android phone, is verification by checking whether a blink action of a user matches a prompt. If the prompt is blinking five times, and a to-be-checked object blinks five times within a specified time, it is determined that living body verification succeeds. This method is easily attacked by using a video. For example, an attacker only needs to make in advance videos of different quantities of times of blinking, and then play a corresponding video according to a prompt.

SUMMARY

This specification provides a face verification method and an electronic device, so as to resolve a technical problem of an attack resulting from a photo, a video, 3D printing, or another technology.

A first aspect provides a face verification method, applied to an electronic device including a display screen and a camera, where the method includes:

displaying one or more pieces of content on the display screen, where the content includes a character, a picture, or a video; obtaining k face images by using the camera during display of the one or more pieces of content, where k is an integer not less than 2; determining t facial expression parameter values according to the obtained k face images, where the facial expression parameter value includes at least one of a facial expression code value or a pupil relative value, t is an integer not less than 2, and t>k; and if a matching degree of the determined t facial expression parameter values and a first preset reference sequence is not less than a first preset threshold, and a face matching result obtained according to at least one of the obtained k face images is success, determining that a face verification result is success.

In a possible design, the first reference sequence preset by the electronic device includes at least one of a first facial expression subsequence or a first pupil subsequence.

If the first reference sequence includes only the first facial expression subsequence, the electronic device determines, according to the obtained k face images, that the t facial expression parameter values are t facial expression code values; and if a matching degree of the determined t facial expression code values and the first facial expression subsequence is not less than the first preset threshold, and a face matching result obtained according to at least one of the obtained k face images is success, determines that a face verification result is success; or If the first reference sequence includes only the first pupil subsequence, the electronic device determines, according to the obtained k face images, that the t facial expression parameter values are t pupil relative values; and if a matching degree of the determined t pupil relative values and the first pupil subsequence is not less than the first preset threshold, and a face matching result obtained according to at least one of the obtained k face images is success, determines that a face verification result is success.

In a possible design, if the first reference sequence includes a first pupil subsequence and a first facial expression subsequence, there may be specifically the following three cases.

In a first possible design, the electronic device first determines t facial expression code values according to the obtained k face images, and if a matching degree of the determined t facial expression code values and the first facial expression subsequence is less than the first preset threshold, then determines t pupil relative values according to the obtained k face images.

In a second possible design, the electronic device first determines t pupil relative values according to the obtained k face images, and if a matching degree of the determined t pupil relative values and the first pupil subsequence is less than the first preset threshold, then determines t facial expression code values according to the obtained k face images.

In a third possible design, the electronic device determines both t facial expression code values and t pupil relative values according to the obtained k face images, for the third case, if a matching degree of the determined t pupil relative values and the first pupil subsequence is not less than the first preset threshold, a matching degree of the determined t facial expression code values and the first facial expression subsequence is not less than the first preset threshold, and a face matching result obtained according to at least one of the obtained k face images is success, determines that a face validation result is success; or if a product of a matching degree of the determined t pupil relative values and the first pupil subsequence and a matching degree of the determined t facial expression code values and the first facial expression subsequence is not less than the first preset threshold, and a face matching result obtained according to at least one of the obtained k face images is success, determines that a face validation result is success.

In this technical solution, the electronic device captures, by displaying content on a display screen, a facial expression change and/or a pupil change provided by a user with respect to the content, to perform living body verification. Compared with the prior art in which living body verification is performed by blinking according to a prompt or performed by means of single interaction, this method increases a difficulty of living body verification, so as to reduce a possibility of an attack resulting from a photo, a video, 3D printing, or another technology. In addition, during living body verification, there is no need to deliberately prompt the user, interaction with the user becomes more natural, and user experience is enhanced.

In a possible design, if a matching degree of the determined t facial expression parameter values and the first reference sequence is less than the first preset threshold, one or more other pieces of content are displayed on the display screen; during display of the one or more other pieces of content, k face images are reobtained by using the camera; t facial expression parameter values are redetermined according to the reobtained k face images; and if a matching degree of the redetermined t facial expression parameter values and a second preset reference sequence is not less than a second preset threshold, and a face matching result obtained according to at least one of the reobtained k face images is success, a face verification result is success.

In this technical solution, if living body verification performed for the first time fails, there may be some objective reasons. For example, a captured face image is unclear, or an obtained face image is not real because same content is often displayed. Therefore, to prevent incorrect determining, the electronic device displays one or more other pieces of content on the display screen, and performs living body verification by using a same method again. It should be noted that a quantity of times of repeatedly performing living body verification by the electronic device in this manner may be preset and adjusted according to an actual condition. This is not limited in the present invention.

In a possible design, if the face matching result obtained according to the at least one of the obtained k face images is failure, the electronic device may perform face matching again according to at least one of the obtained k face images.

In this technical solution, if face matching performed for the first time fails, there may be some objective reasons. For example, a face image for user verification is unclear, or there is no face in a face image used for verification. Therefore, to prevent incorrect determining, the electronic device performs face matching according to another obtained face image. It should be noted that a quantity of times of repeatedly performing face matching by the electronic device in this manner may be preset and adjusted according to an actual condition. This is not limited in the present invention.

In a possible design, if the matching degree of the determined t facial expression parameter values and the first reference sequence is less than the first preset threshold and/or the face matching result obtained according to the at least one of the obtained k face images is failure, the electronic device determines that a face verification result is failure.

In a possible design, if the matching degree of the determined t facial expression parameter values and the first reference sequence is less than the first preset threshold and/or the face matching result obtained according to the at least one of the obtained k face images is failure, the electronic device determines that a face verification result is failure.

In a possible design, if one or more pieces of content are simultaneously displayed on the display screen, the electronic device obtains, according to a preset interval, the k face images after the one or more pieces of content start being displayed.

In a possible design, if multiple pieces of content are sequentially displayed on the display screen, the electronic device obtains at least one face image during display of each piece of content, where a total quantity of the obtained face images is k.

In a possible design, the one piece of content is one piece of content randomly selected from multiple pieces of content stored in the electronic device, where each piece of content is corresponding to a reference sequence, or the multiple pieces of content are one set of content randomly selected from multiple sets of content stored in the electronic device, where each set of content is corresponding to a reference sequence.

In this technical solution, the electronic device prestores multiple pieces of content. As a quantity of the prestored content increases, it is more difficult to suffer an attack resulting from a photo, a video, and a 3D printing technology.

A second aspect further provides an electronic device, where the electronic device includes at least a display screen, a camera, and at least one processor, and the electronic device executes a part of the method or the entire method in the first aspect by using the display screen, the camera, and the at least one processor.

A third aspect further provides an electronic device, where the electronic device includes a display screen, a camera, a memory, a bus system, and at least one processor, and the display screen, the camera, the memory, and the at least one processor are connected by using the bus system; and one or more programs are stored in the memory, the one or more programs include an instruction, and when being executed by the electronic device, the instruction enables the electronic device to execute a part of the method or the entire method in the first aspect.

A fourth aspect further provides a computer storage medium, that is, a computer readable storage medium storing one or more programs, where the one or more programs include an instruction, and when being executed by an electronic device, the instruction enables the electronic device to execute a part of the method or the entire method in the first aspect.

A fifth aspect further provides an electronic device, where the electronic device includes a display screen, a camera, at least one processor, and a memory, the memory stores one or more programs, and the at least one processor is configured to invoke the one or more programs stored in the memory, so that the electronic device executes a part of the method or the entire method in the first aspect.

BRIEF DESCRIPTION OF DRAWINGS

To describe embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Herein, some basic concepts related to the embodiments of the present invention are first described.

Figure 1:
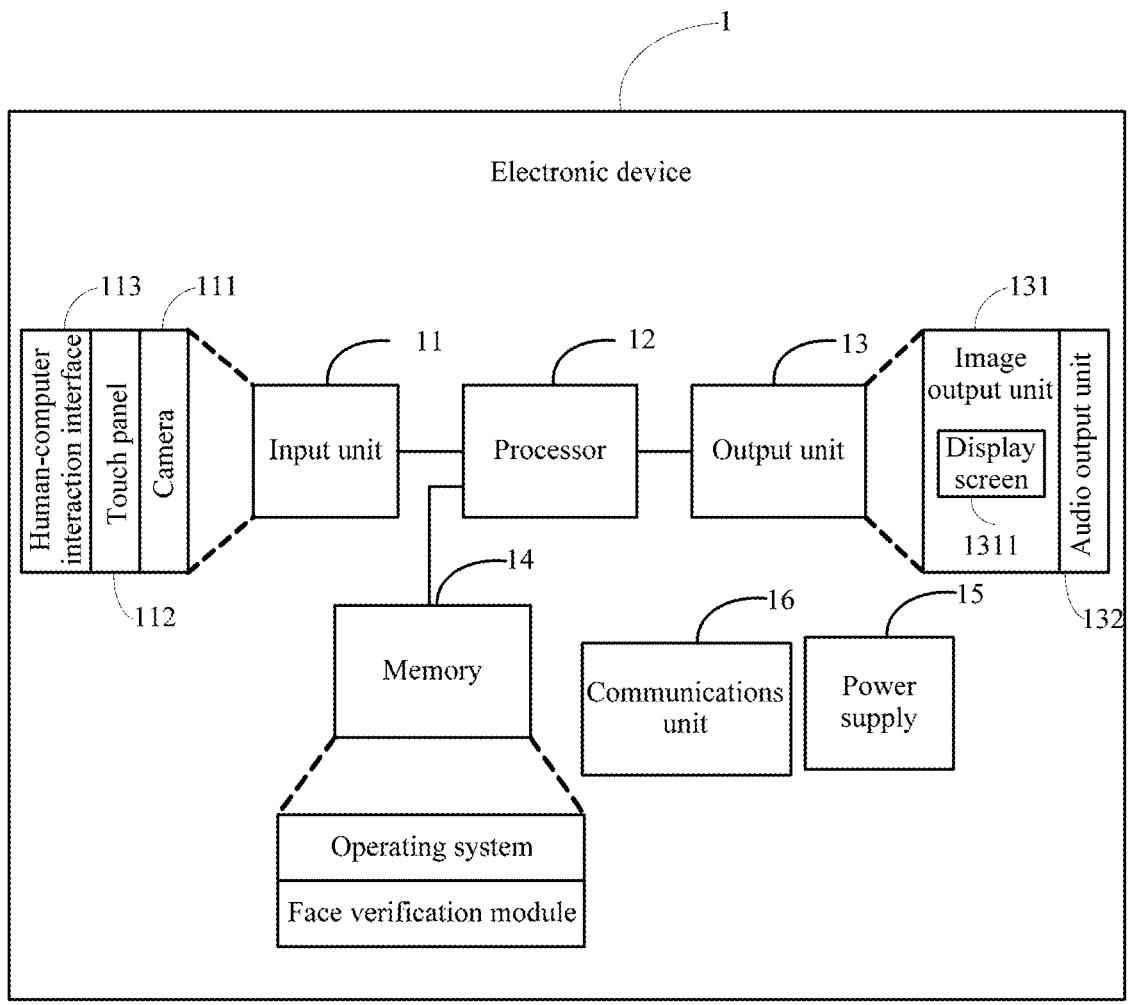
FIG. 1 is a schematic structural diagram of an electronic device according to an embodiment of the present invention.

An electronic device provided in an embodiment of the present invention may be shown in FIG. 1. The electronic device 1 includes components such as an input unit 11, at least one processor 12, an output unit 13, a memory 14, a power supply 15, and a communications unit 16. These components communicate with each other by using one or more buses.

A person skilled in the art can understand that a structure of the electronic device shown in the figure is not construed as a limitation on the present invention. The electronic device may be of a bus structure or may be of a star structure, and may further include components more or fewer than those shown in the figure, or a combination of some components, or components disposed differently. In this implementation of the present invention, the electronic device 1 may be any mobile or portable electronic device, including but not limited to, a mobile phone, a mobile computer, a tablet computer, a personal digital assistant (Personal Digital Assistant, PDA), a media player, a smart television, or a combination of two or more thereof.

The input unit 11 is configured to implement interaction between a user and the electronic device and/or input information into the electronic device. For example, the input unit 11 may receive digital or character information entered by a user, to generate signal input related to user setting or function control. In a specific implementation of the present invention, the input unit 11 includes at least a camera 111, and the input unit 11 may further include a touch panel 112 and/or another human-computer interaction interface 113 such as a physical enter key and a microphone.

The touch panel 112, also referred to as a touchscreen or touch control screen, may collect a touch operation performed by a user on the touch panel 112 or near touch panel 112. For example, the user performs an operation on or near the touch panel by using any proper object or accessory such as a finger or a stylus, and drives a corresponding connection device according to a preset program. Optionally, the touch panel may include two parts: a touch detection apparatus and a touch controller. The touch detection apparatus detects a touch operation of the user, converts the detected touch operation into an electrical signal, and transfers the electrical signal to the touch controller. The touch controller receives the electrical signal from the touch detection apparatus, converts the electrical signal into contact coordinates, and then sends the contact coordinates to the processor. The touch controller may further receive and execute a command sent by the processor. In addition, the touch panel may be implemented by using multiple types, such as a resistive type, a capacitive type, an infrared (Infrared) type, and a surface acoustic wave type. In another implementation of the present invention, the physical enter key used by the input unit 11 may include but is not limited to one or more of a physical keyboard, a function key (for example, a volume control key or an on/off key), a trackball, a mouse, a joystick, and the like. The input unit 11 in a form of a microphone may collect voice input by a user or from an environment and convert the voice into a command that is in a form of an electrical signal and that can be executed by the processor.

The processor 12 is a control center of the electronic device, and is connected to all parts of the entire electronic device by using various interfaces and lines, and executes, by running or executing a software program and/or module stored in the memory and invoking data stored in the memory, various functions of the electronic device and/or data processing. The processor 12 may include an integrated circuit (Integrated Circuit, IC for short), for example, may include a single packaged IC, or may be formed by connecting multiple packaged ICs having a same function or different functions. For example, the processor 12 may include only a central processing unit (Central Processing Unit, CPU for short), or may be a combination of a GPU, a digital signal processor (Digital Signal Processor, DSP for short), and a control chip (for example, a baseband chip) in the communications unit 16. In this implementation of the present invention, the CPU may be a single computing core, or may include multiple computing cores.

The output unit 13 includes but is not limited to an image output unit 131 and an voice output unit 132. The image output unit is configured to output a character, a picture, and/or a video. In this embodiment of the present invention, the image output unit 131 includes at least a display screen 1311, for example, a display screen configured in a form of an LCD (Liquid Crystal Display, liquid crystal display), an OLED (Organic Light-Emitting Diode, organic light-emitting diode), and a field emission display (field emission display, FED for short). Alternatively, the image output unit may include a reflective display such as an electrophoretic (electrophoretic) display, or a display using an interferometric modulation of light (Interferometric Modulation of Light). The image output unit may include a single display or multiple displays of different sizes. In a specific implementation of the present invention, the touch panel used by the input unit 11 and the display screen used by the output unit 13 may be collectively referred to as a display. After detecting a touch operation on the touch panel or a gesture operation near the touch panel, the touch panel transmits information about the operation to the processor 12 to determine a touch event type. Subsequently, the processor 12 provides corresponding visual output on the display screen according to the touch event type. In FIG. 1, the input unit 11 and the output unit 13 are used as two independent components to implement input and output functions of the electronic device. However, in some embodiments, the touch panel and the display screen may be integrated to implement the input and output functions of the electronic device. For example, the image output unit may display various graphical user interfaces (Graphical User Interface, GUI for short) to serve as virtual control components, including but not limited to a window, a scroll bar, an icon, and a scrapbook, for a user to perform an operation by means of touch.

In a specific implementation of the present invention, the image output unit includes a filter and an amplifier for filtering and zooming in a video output by the processor. The audio output unit includes a digital-to-analog converter, configured to convert an audio signal, output by the processor, from a digital format to an analog format.

The memory 14 may be configured to store a software program and a module. The processor 12 runs the software program and the module stored in the memory 14, so as to execute various function applications of the electronic device and implement data processing. The memory 14 may mainly include a program storage area and a data storage area. The program storage area may store an operating system, and an application program required by at least one function, for example, an audio playback program and an image playback program. The data storage area may store data (for example, audio data and a phone book) created according to use of the electronic device and the like. In a specific implementation of the present invention, the memory 14 may include a volatile memory, for example, a nonvolatile random access memory (Nonvolatile Random Access Memory, NVRAM for short), a phase change random access memory (Phase Change RAM, PRAM for short), and a magetoresistive random access memory (Magetoresistive RAM, MRAM for short). The memory 14 may further include a nonvolatile memory, for example, at least one disk storage device, an electrically erasable programmable read-only memory (Electrically Erasable Programmable Read-Only Memory, EEPROM for short), and a flash memory such as an NOR flash memory (NOR flash memory) or an NAND flash memory (NAND flash memory). The nonvolatile memory stores an operating system and an application program that are executed by the processor. The memory 14 loads a running program and data from the nonvolatile memory to a memory, and stores digital content in a large-capacity storage apparatus. The operating system includes various components and/or drivers that are configured to control and manage conventional system tasks such as memory management, storage device control, and power management and that facilitate communication between various types of hardware and software. In this implementation of the present invention, the operating system may be an Android system of Google, an iOS system developed by Apple, a Windows operating system developed by Microsoft, or an embedded operating system such as Vxworks.

The application program includes any application installed on the electronic device, including but not limited to a browser, an email, an instant messaging service, word processing, keyboard virtualization, a widget (Widget), encryption, digital copyright management, voice recognition, voice reproduction, positioning (such as a function provided by a global positioning system), music playback, and the like.

The power supply 15 is configured to supply power to different components of the electronic device to maintain running of the electronic device. In general, the power supply may be a built-in battery such as a common lithium ion battery and a nickel hydrogen battery, and also include an external power source, such as an AC adapter, that directly supplies power to the electronic device. In some implementations of the present invention, the power supply may also be more broadly defined, for example, may further include a power management system, a charging system, a power failure detection circuit, a power converter or an inverter, a power status indicator (for example, a light emitting diode), and any other components associated with electricity generation, management and distribution of the electronic device.

The communications unit 16 is configured to establish a communication channel, so that the electronic device is connected to a remote server by using the communication channel and downloads media data from the remote server. The communications unit 16 may include a communication module such as a wireless local area network (Wireless Local Area Network, wireless LAN for short) module, a Bluetooth module, and a baseband (Base Band) module, as well as a radio frequency (Radio Frequency, RF for short) circuit corresponding to the communication module, for performing wireless local area network communication, Bluetooth communication, infrared communication, and/or cellular communications system communication, for example, Wideband Code Division Multiple Access (Wideband Code Division Multiple Access, W-CDMA for short) and/or high speed downlink packet access (High Speed Downlink Packet Access, HSDPA for short). The communication module is configured to control communication of the components in the electronic device and can support direct memory access (Direct Memory Access).

In a different implementation of the present invention, the communication modules in the communications unit 16 are generally presented in a form of an integrated circuit chip (Integrated Circuit Chip) and can be selectively combined without requiring that all the communication modules and corresponding antenna groups be included. For example, the communications unit 16 may include only a baseband chip, a radio frequency chip, and a corresponding antenna, to provide a communication function in a cellular communications system. The electronic device may be connected to a cellular network (Cellular Network) or the Internet (Internet) by using a wireless communication connection, such as wireless local area network access or WCDMA access, established by the communications unit 16. In some optional implementations of the present invention, the communication modules, such as the baseband module, in the communications unit 16 may be integrated into the processor unit. A typical example is an APQ+MDM series platform provided by Qualcomm (Qualcomm).

The RF circuit is configured to receive and send information, or receive and send a signal in a call process. For example, after receiving downlink information of a base station, the RF circuit sends the downlink information to the processor for processing; and additionally, sends uplink data to the base station. Generally, the RF circuit includes a well-known circuit for implementing functions, including but not limited to an antenna system, a radio frequency transceiver, one or more amplifiers, a tuner, one or more oscillators, a digital signal processor, a codec (Codec) chipset, a subscriber identity module (SIM) card, a memory, and the like. In addition, the RF circuit may further communicate with a network and another device by means of wireless communication. Any communications standard or protocol may be used for the wireless communication, including but not limited to GSM (Global System of Mobile communication, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), High Speed Uplink Packet Access (High Speed Uplink Packet Access, HSUPA), LTE (Long Term Evolution, Long Term Evolution), an email, an SMS (Short Messaging Service, short message service), and the like.

In a possible implementation, the electronic device 1 may display one or more pieces of content on the display screen 1311, where the content includes a character, a picture, or a video; and obtain k face images by using the camera 111 during display of the one or more pieces of content, where k is an integer not less than 2. The processor 12 invokes code stored in the memory 14 to perform the following operation:

determining t facial expression parameter values according to the obtained k face images, where the facial expression parameter value includes at least one of a facial expression code value or a pupil relative value; and if a matching degree of the determined t facial expression parameter values and a first preset reference sequence is not less than a first preset threshold, and a face matching result obtained according to at least one of the obtained k face images is success, determining that a face verification result is success, where t is an integer not less than 2, and t≤k.

If the matching degree of the determined t facial expression parameter values and the first reference sequence is less than the first preset threshold and/or the face matching result obtained according to the at least one of the obtained k face images is failure, the processor 12 may determine that a face verification result is failure.

Further, if the matching degree of the determined t facial expression parameter values and the first reference sequence is less than the first preset threshold, the display screen 1311 may further display one or more other pieces of content; the camera 111 may further reobtain k face images during display of the one or more other pieces of content; and the processor 12 may redetermine t facial expression parameter values according to the reobtained k face images, and if a matching degree of the redetermined t facial expression parameter values and a second preset reference sequence is not less than a second preset threshold, and a face matching result obtained according to at least one of the reobtained k face images is success, determines that a face verification result is success.

If the matching degree of the redetermined t facial expression parameter values and the second reference sequence is less than the second preset threshold and/or the face matching result obtained according to the at least one of the reobtained k face images is failure, the processor 12 determines that a face verification result is failure.

Optionally, if the display screen 1311 simultaneously displays one or more pieces of content, the camera 111 may obtain, according to a preset interval, the k face images after the one or more pieces of content start being displayed.

Optionally, if the display screen 1311 displays multiple pieces of content sequentially, the camera 111 may obtain at least one face image during display of each piece of content, where a total quantity of the obtained face images is k.

The one piece of content is one piece of content randomly selected from multiple pieces of content stored in the electronic device, where each piece of content is corresponding to a reference sequence, or the multiple pieces of content are one set of content randomly selected from multiple sets of content stored in the electronic device, where each set of content is corresponding to a reference sequence.

It can be understood that, in this implementation, functions of the function modules of the electronic device 1 can be specifically implemented according to methods in method embodiments shown in FIG. 2 to FIG. 6, and may be corresponding to related descriptions of FIG. 2 to FIG. 6. Details are not described herein.

Herein, several terms related to all the embodiments of the present invention are described.

A facial expression parameter value includes at least one of a facial expression code value or a pupil relative value. For the facial expression code value and the pupil relative value, refer to the following description.

It is found from a study that humans mainly have at least seven facial expressions, and facial features of all the facial expressions are different. Happy facial features include quirked-up mouth corners, raised cheeks with wrinkles, narrowed eyelids, and "crow's feet" formed at outer corners of eyes. Sad facial features include squinted eyes, eyebrows brought together, mouth corners turned down, and a chin pulled up or bunched. Frightened facial features include an opened mouth and opened eyes, raised eyebrows, and flared nostrils. Angry facial features include downcast eyebrows, a wrinkled forehead, and tensed eyelids and tensed lips. Disgusted facial features include a scrunched nose, a raised upper lip, downcast eyebrows, and squinted eyes. Surprised facial features include a dropped lower jaw, relaxed lips and a relaxed mouth, widened eyes, and slightly raised eyelids and eyebrows. Contemptuous facial features are that one corner of the mouth is raised and a sneer or smirk is made. The foregoing facial expressions can be encoded with numbers. It is assumed that happy, sad, frightened, angry, disgusted, surprised, and contemptuous facial expressions are encoded as 1, 2, 3, 4, 5, 6, and 7 sequentially. The electronic device displays an image on the display screen, and obtains a face image by using the camera during display of the image. If the electronic device learns, by performing analysis on the face image, that a facial expression of a user is sad, the electronic device may determine a code 2. The code is referred to as a facial expression code value in this embodiment of the present invention.

It is further found from the study that a person has pupils of different sizes when having different facial expressions. The electronic device may measure a diameter of a pupil and an eye corner distance. A diameter of a pupil in relative to a same reference corner distance is referred to as a pupil relative value. For example, at a first preset moment, it is detected that a corner distance is 28 mm and that a diameter of a pupil is 4 mm; at a second preset moment, it is detected that a corner distance is 28 mm and that a diameter of the pupil is 5 mm; and at a third preset moment, it is detected that a corner distance is 30 mm and that a diameter of the pupil is 6 mm. It is assumed that a reference corner distance is 28 mm, and pupil relative values are 4 mm, 5 mm, and 5.6 mm in sequence. The reference corner distance may be a corner distance detected at the first preset moment (that is, the moment at which a face image is obtained for the first time after content starts being displayed), or may be most of detected corner distances. The electronic device may extract a shape by performing canny operator edge detection and Hough transformation, to obtain eye corners.

Face matching is a biometric recognition technology for identity recognition based on human face feature information. A face matching process generally includes three steps. A face image database of faces is first created. That is, the camera obtains face images by capturing faces or obtains face images by using photos, generates faceprint (Faceprint) codes by using these face images, and stores the faceprint codes; obtains a face image of a currently detected person, that is, captures the face image of the currently detected person by using the camera or obtains the face image by using a photo of the currently detected person, generates a faceprint code by using the currently obtained face image, and compares the current faceprint code with a faceprint code in the face image database.

Face matching is to perform identity verification on a face image of a detected person or perform target search in the face image database. Actually, this means that a captured face image is compared with face images in the database one by one, so as to find out optimum matching content. Therefore, face descriptions determine a specific method and performance of face matching. Two description methods using an eigenvector and a faceprint template are mainly used. The first one is an eigenvector method. In this method, attributes such as a size, a position, and a distance of a face contour such as eye iris, wings of a nose, and mouth corners are determined, and then geometric characteristic quantities of the attributes are calculated. These characteristic quantities form an eigenvector describing the face. The second one is a faceprint template method. In this method, several standard face image templates or facial organ templates are stored in a database. During comparison, matching is performed on a captured face image and all the templates in the database by means of normalized correlation measurement. In addition, there is also a method of combining an autocorrelation network for pattern recognition or a feature with a template. Actually, a key of a face matching technology is "local human feature analysis" and a "graphics/neural recognition algorithm". The algorithm is a method of using human face organs and face features. For example, an identification parameter formed by data such as a corresponding geometric relationship is compared with all original parameters in a database, and then determining and confirmation are performed thereon.

In a possible design, one or more pieces of content may be simultaneously displayed on the display screen, or multiple pieces of content may be sequentially displayed on the display screen. For related descriptions of simultaneous display of one or more pieces of content, refer to corresponding embodiments of FIG. 2 and FIG. 4; and for related descriptions of successive display of multiple pieces of content, refer to corresponding embodiments of FIG. 5 and FIG. 6. The content includes a character, a picture, or a video.

Figure 2:
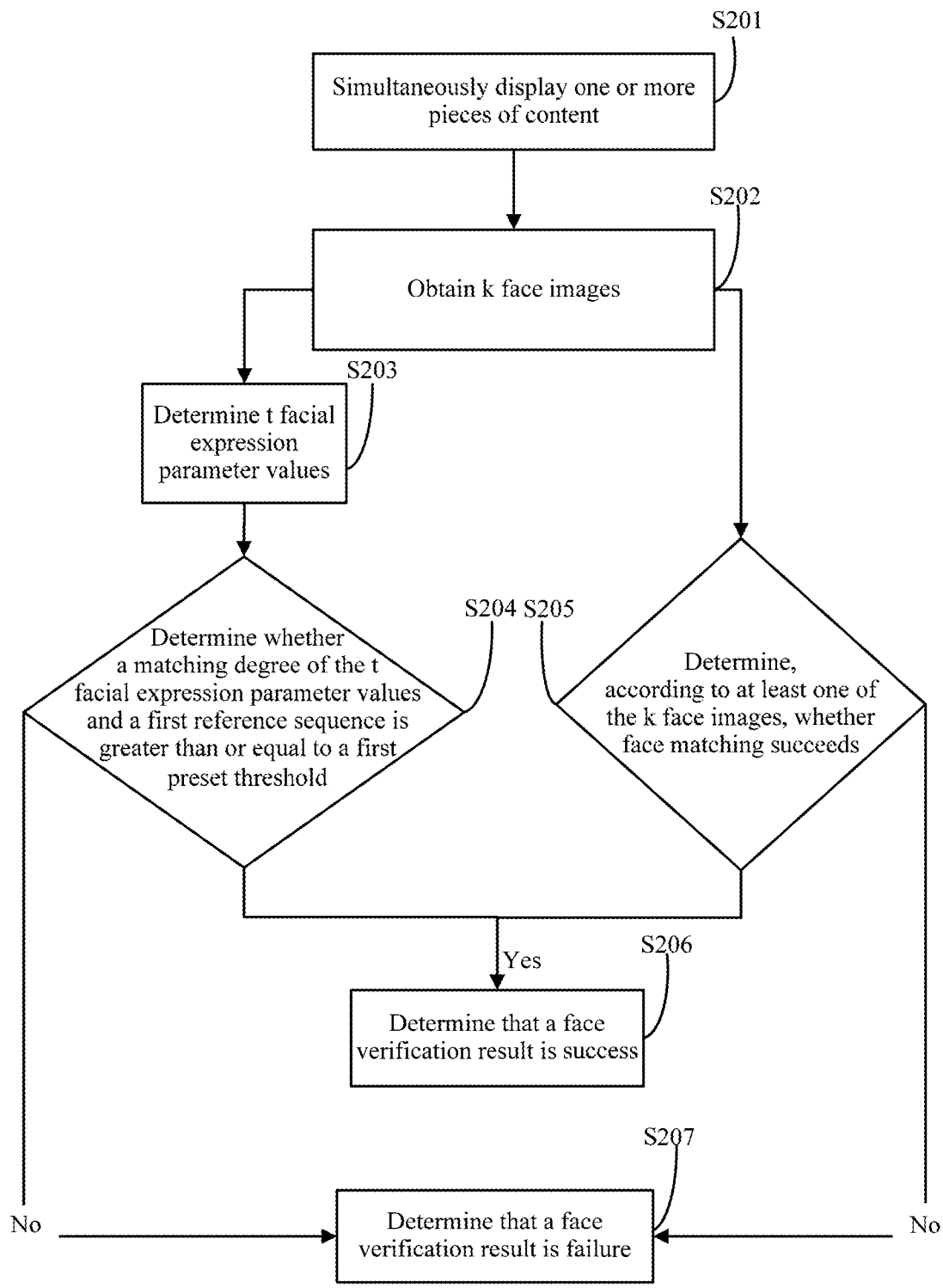
FIG. 2 is a schematic flowchart of a face verification method according to Embodiment 1 of the present invention.

Referring to FIG. 2, FIG. 2 is a schematic flowchart of a face verification method according to Embodiment 1 of the present invention. The face verification method provided in this embodiment of the present invention is applied to an electronic device including a display screen and a camera. As shown in FIG. 2, the method may include the following steps.

Step S201. The electronic device simultaneously displays one or more pieces of content on the display screen, where the content includes a character, a picture, or a video.

Specifically, when the electronic device receives a face verification instruction, the one or more pieces of content may be simultaneously displayed on the display screen of the electronic device. A mobile phone is used as an example of the electronic device. For example, when the mobile phone is being unlocked, it may be considered that a face verification instruction is received. An access control device is used as an example of the electronic device. For example, when the access control device is performing authentication, it may be considered that a face verification instruction is received.

In an optional implementation, the electronic device may prestore multiple pieces of content, each piece of content is corresponding to a reference sequence, and when receiving the face verification instruction, the electronic device may randomly obtain one piece of content from the prestored multiple pieces of content and display the content on the display screen.

In another optional implementation, the electronic device may prestore multiple sets of content, each set of content includes multiple pieces of content, each set of content is corresponding to a reference sequence, and when receiving the face verification instruction, the electronic device may randomly obtain one of the prestored multiple sets of content, and simultaneously display this set of content on the display screen.

Figure 3A:
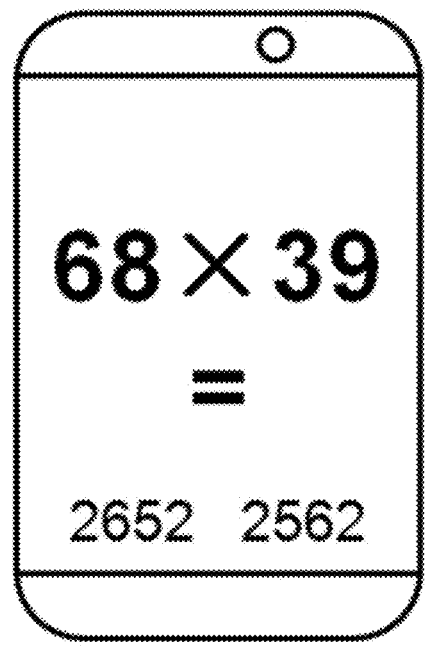
FIG. 3a is a schematic diagram of displaying a text in the embodiment shown in FIG. 2.
Figure 3B:
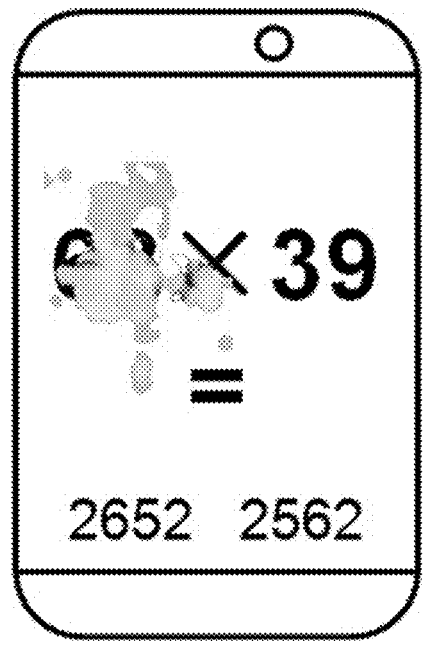
FIG. 3b is another schematic diagram of displaying a text in the embodiment shown in FIG. 2.
Figure 3C:
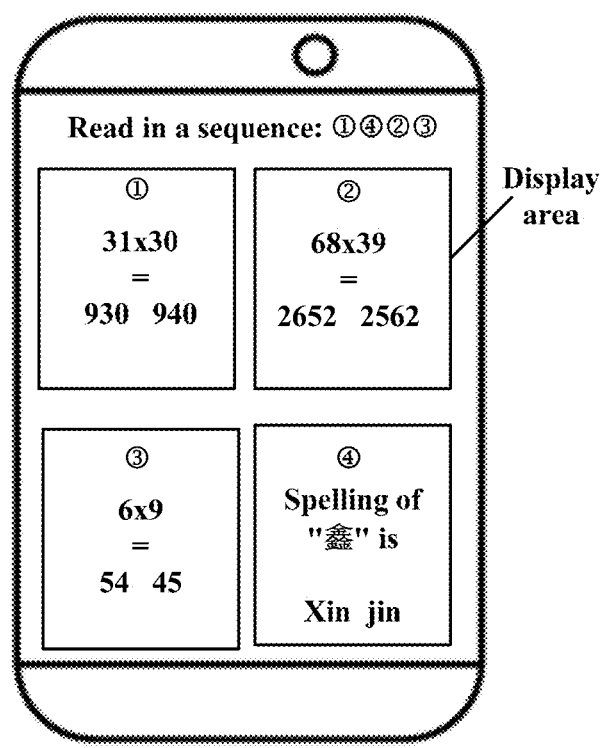
FIG. 3c is a schematic diagram of displaying multiple texts in the embodiment shown in FIG. 2.

If the content is a character, that the electronic device displays one piece of content on the display screen of the electronic device may be specifically: displaying a text on the display screen, for example, displaying a question including characters, as shown in FIG. 3*a*, and for another example, displaying characters with uneven clarity, as shown in FIG. 3*b*. That the electronic device displays multiple pieces of content on the display screen may be specifically: the electronic device determines a quantity of content required to be displayed; determines display areas of the display screen according to the quantity, where one piece of content is displayed in one display area; and prompts a user to look at the different areas in a specific sequence, as shown in FIG. 3*c*.

Figure 3D:
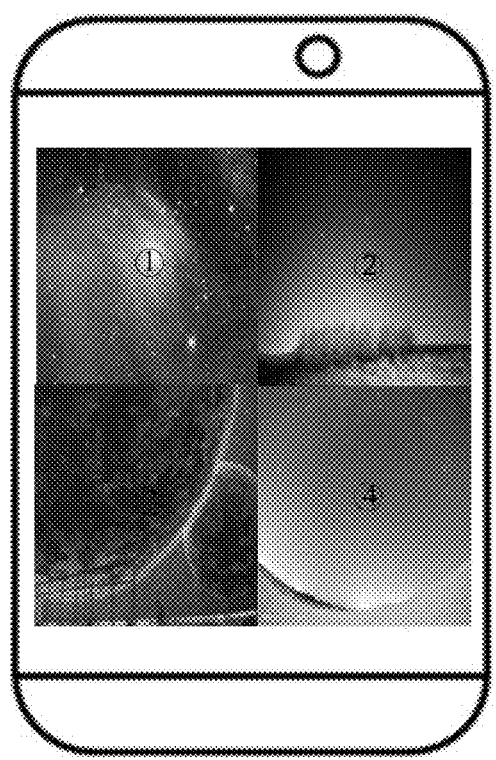
FIG. 3d is a schematic diagram of displaying a picture in the embodiment shown in FIG. 2.

If the content is a picture, that the electronic device displays one piece of content on the display screen may be specifically: displaying a static picture on the display screen, where content of the picture has uneven complexity in space, and the picture prompts a user to look at different areas of the picture in a specific sequence, as shown in FIG. 3*d*. That the electronic device displays multiple pieces of content on the display screen may be specifically: the electronic device determines a quantity of content required to be displayed; determines display areas of the display screen according to the quantity, where one piece of content is displayed in one display area; and prompts a user to look at the different areas in a specific sequence. If the content is a video, that the electronic device displays one piece of content on the display screen may be specifically: displaying a video clip on the display screen.

It should be noted that the electronic device in FIG. 3*a*, FIG. 3*b*, FIG. 3*c*, and FIG. 3*d* is a mobile phone. In another optional embodiment, the electronic device may also be a PAD, a media player, and the like. The foregoing is merely a specific embodiment of possible embodiments of the present invention. This imposes no limitation on the present invention.

In this embodiment of the present invention, a facial expression change and a pupil change provided by a user with respect to content are captured by displaying the content, and living body verification is performed according to the facial expression change and/or the pupil change. In this way, impact of a video attack is reduced, deliberately prompting the user is avoided, interaction with the user becomes more natural, and user experience is enhanced.

It should be noted that, in another optional embodiment, displaying content on the display screen may be replaced by playing an audio clip by using an voice output unit, so as to capture a facial expression change and a pupil change provided by a user with respect to the audio clip, and perform living body verification according to the facial expression change and/or the pupil change.

Step S202. The electronic device obtains k face images by using the camera during display of the one or more pieces of content, where k is an integer not less than 2.

Specifically, when starting simultaneously displaying the one or more pieces of content on the display screen, the electronic device may call its own camera to obtain a face image of a user. The electronic device may preset at least two moments and start obtaining a face image of the user at a corresponding moment after the content starts being displayed. An interval between the moments may be equal or unequal. The electronic device may also determine each moment according to a preset interval, that is, obtain, according to the preset interval, face images after the content starts being displayed.

It should be noted that a quantity of the face images obtained by the camera at each moment may be the same or different. This is not limited in the present invention.

For ease of description, in this embodiment of the present invention, an example in which two moments, that is, a first preset moment and a second preset moment, are preset is used. The camera may start obtaining m face images at the first preset moment after the content starts being displayed, and start obtaining n face images at the second preset moment after the content starts being displayed, where m and n are integers that are not less than 1, m and n may be the same or different, and k=m+n. It is assumed that the first preset moment is the first second, the second preset moment is the third second, and both m and n are 3. The electronic device continuously obtains three face images by calling the camera at the first second after the content starts being displayed, and continuously obtains three face images by calling the camera at the third second after the content starts being displayed.

Optionally, during display of the content, the electronic device may obtain k face images in total for k times, where one face image is obtained each time.

Step S203. The electronic device determines t facial expression parameter values according to the obtained k face images, where the facial expression parameter value includes at least one of a facial expression code value or a pupil relative value, t is an integer not less than 2, and t≤k.

If only one face image is obtained at each preset moment, k and t are equal.

If the camera obtains m face images starting from the first preset moment after the content starts being displayed, and obtains n face images starting from the second preset moment after the content starts being displayed, the electronic device may determine a facial expression parameter value according to at least one of the m face images obtained starting from the first preset moment and determines a facial expression parameter value according to at least one of the n face images obtained starting from the second preset moment.

Because processing procedures in which the electronic device determines facial expression parameter values according to face images obtained at all moments are the same, in this embodiment of the present invention, the first preset moment is used as an example for detailed description, and a processing procedure performed in another preset moment is similar. Details are not repeated herein.

In an optional implementation, the electronic device may select a clearest one of the m face images obtained starting from the first preset moment, and determine a facial expression parameter value according to the selected face image.

In another optional implementation, the electronic device may alternatively obtain at least two face images of the m face images obtained starting from the first preset moment, then obtain a facial expression parameter value of each face image, compare the obtained facial expression parameter values, and select a facial expression parameter value that is obtained most frequently. It is assumed that the electronic device obtains five facial expression parameter values, and the five facial expression parameter values are (3, 3, 3, 2, 4). The electronic device may determine that the facial expression parameter value is 3.

The facial expression parameter value may include at least one of a facial expression code value or a pupil relative value. The electronic device may determine, from a face image according to a first reference sequence prestored for the displayed content, whether only the facial expression code value is obtained, only the pupil relative value is obtained, or the facial expression code value and the pupil relative value are obtained.

The first reference sequence includes at least one of a first facial expression subsequence or a first pupil subsequence.

If the first reference sequence includes only the first facial expression subsequence, the electronic device determines, according to the obtained face image, that the facial expression parameter value is a facial expression code value. Specifically, the electronic device may select one clearest face image from the m face images obtained starting from the first preset moment, and determine a facial expression code value according to the selected face image; or the electronic device may obtain at least two face images from the m face images obtained starting from the first preset moment, then obtain a facial expression code value of each face image, compare the obtained facial expression code values, and take a facial expression code value of a largest quantity.

If the first reference sequence includes only the first pupil subsequence, the electronic device determines the facial expression parameter value as a pupil relative value according to the obtained face image. Specifically, if the facial expression parameter value is the pupil relative value, the electronic device may select one clearest face image from the m face images obtained starting from the first preset moment, and determine the pupil relative value according to the selected one face image; or, the electronic device may obtain at least two face images from the m face images obtained starting from the first preset moment, then obtain a pupil relative value of each of the face images, compare the obtained pupil relative values, and select a pupil relative value that is obtained most frequently.

If the first reference sequence includes a first pupil subsequence and a first facial expression subsequence, there may be specifically the following three cases.

In a first case, the electronic device first determines t facial expression code values according to the obtained k face images, and if a matching degree of the determined t facial expression code values and the first facial expression subsequence is less than a first preset threshold, then determines t pupil relative values according to the obtained k face images.

In a second case, the electronic device first determines t pupil relative values according to the obtained k face images, and if a matching degree of the determined t pupil relative values and the first pupil subsequence is less than a first preset threshold, then determines t facial expression code values according to the obtained k face images.

In a third case, the electronic device determines both t facial expression code values and t pupil relative values according to the obtained k face images.

It should be noted that, for how the electronic device determines the t facial expression code values and the t pupil relative values according to the k face images, refer to the foregoing description. Details are not repeated herein.

Step S204. The electronic device determines whether a matching degree of the determined t facial expression parameter values and a first preset reference sequence is not less than a first preset threshold.

After obtaining the t facial expression parameter values, the electronic device may match the obtained t facial expression parameter values against the first reference sequence; and if the matching degree is not less than the first preset threshold, a living body verification result is success. The first preset threshold may be adjusted according to an actual condition.

If the facial expression parameter value is a facial expression code value, the electronic device may match t facial expression code values against the first reference sequence. Assuming that the first reference sequence prestored by the electronic device for the content is (7, 3, 2, 2, 1), and that the first preset threshold is 80%, if at least two of obtained five facial expression code values are different from a code value corresponding to the first reference sequence, the electronic device determines that a matching degree is less than the first preset threshold, for example the t facial expression code values are (7, 2, 2, 2, 2); if less than two of obtained five facial expression code values are different from a code value corresponding to the first reference sequence, the electronic device determines that the matching degree reaches the first preset threshold.

If the facial expression parameter value is a pupil relative value, the electronic device may match t pupil relative values against the first reference sequence. Assuming that the first reference sequence prestored by the electronic device for the content is (7, 7, 5, 3, 4), and that the first preset threshold is 80%, if at least two of obtained five facial expression code values are different from a code value corresponding to the first reference sequence, the electronic device determines that a matching degree is less than the first preset threshold; or otherwise, if the t facial expression code values are (7, 6, 5, 6, 4), determines that a matching degree reaches the first preset threshold.

It should be noted that, if the facial expression parameter value is a pupil relative value, the electronic device may also match t pupil relative values against a change trend of the first reference sequence; and if the t pupil relative values match the change trend of the first reference sequence, determine that a matching degree of the t pupil relative values and the first reference sequence reaches the first preset threshold. In a specific implementation, a change trend may be obtained by directly comparing difference sequences of sequences, where each difference sequence is a sequence formed by a difference between a value and another value after the value in the sequence. If a difference sequence of (7, 7, 5, 3, 4) is (0, −2, −2, 1), and a difference sequence of (5, 5, 3, 1, 2) is also the (0, −2, −2, 1), the two sequences are the same. A similarity of difference sequences may be measured and evaluated by using a Euclidean distance (Euclidean Distance), a Minkowski distance (Minkowski Distance), a Manhattan distance (Manhattan Distance), a Chebyshev distance (Chebyshev Distance), or a Mahalanobis distance (Mahalanobis Distance).

If the facial expression parameter value is a facial expression code value and a pupil relative value, and the first reference sequence correspondingly has two subsequences, that is, a facial expression subsequence corresponding to the facial expression code value and a pupil subsequence corresponding to the pupil relative value, the electronic device may match t facial expression code values against the facial expression subsequence and match t pupil relative values against the pupil subsequence, and if a matching degree of the facial expression code values and the facial expression subsequence reaches the first preset threshold, and a matching degree of the pupil relative values and the pupil subsequence reaches the first preset threshold, or a product of a matching degree of the facial expression code values and the facial expression subsequence and a matching degree of the pupil relative values and the pupil subsequence reaches the first preset threshold, determine that the matching degree of the t facial expression parameter values and the first preset reference sequence is not less than the first preset threshold.

Step S205. The electronic device determines, according to at least one of the obtained k face images, whether face matching succeeds. Specifically, the electronic device may select at least one clearest face image from the obtained k face images for face matching. It should be noted that how the electronic device performs face matching can be understood by a person skilled in the art and is not described herein.

It should be noted that step S204 and step S205 may be performed at the same time, step S204 may be performed followed by step S205, or step S205 may be performed followed by step S204. There is no strict execution sequence between the two steps. This imposes no limitation on the present invention.

Step S206. If the matching degree of the determined t facial expression parameter values and the first preset reference sequence is not less than the first preset threshold, and a face matching result obtained according to the at least one of the obtained k face images is success, the electronic device determines that a face verification result is success.

Step S207. If the matching degree of the determined t facial expression parameter values and the first reference sequence is less than the first preset threshold and/or the face matching result obtained according to the at least one of the obtained k face images is failure, determine that a face verification result is failure.

In the embodiment shown in FIG. 2, an electronic device captures, by displaying one piece of content on a display screen, a facial expression change and a pupil change provided by a user with respect to the content, to perform living body verification. Compared with the prior art in which living body verification is performed by blinking according to a prompt or performed by means of single interaction, this embodiment of the present invention greatly increases a difficulty of living body verification, so as to reduce a possibility of an attack resulting from a photo, a video, 3D printing, or another technology. In addition, during living body verification, there is no need to deliberately prompt the user, interaction with the user becomes more natural, and user experience is enhanced.

Figure 4:
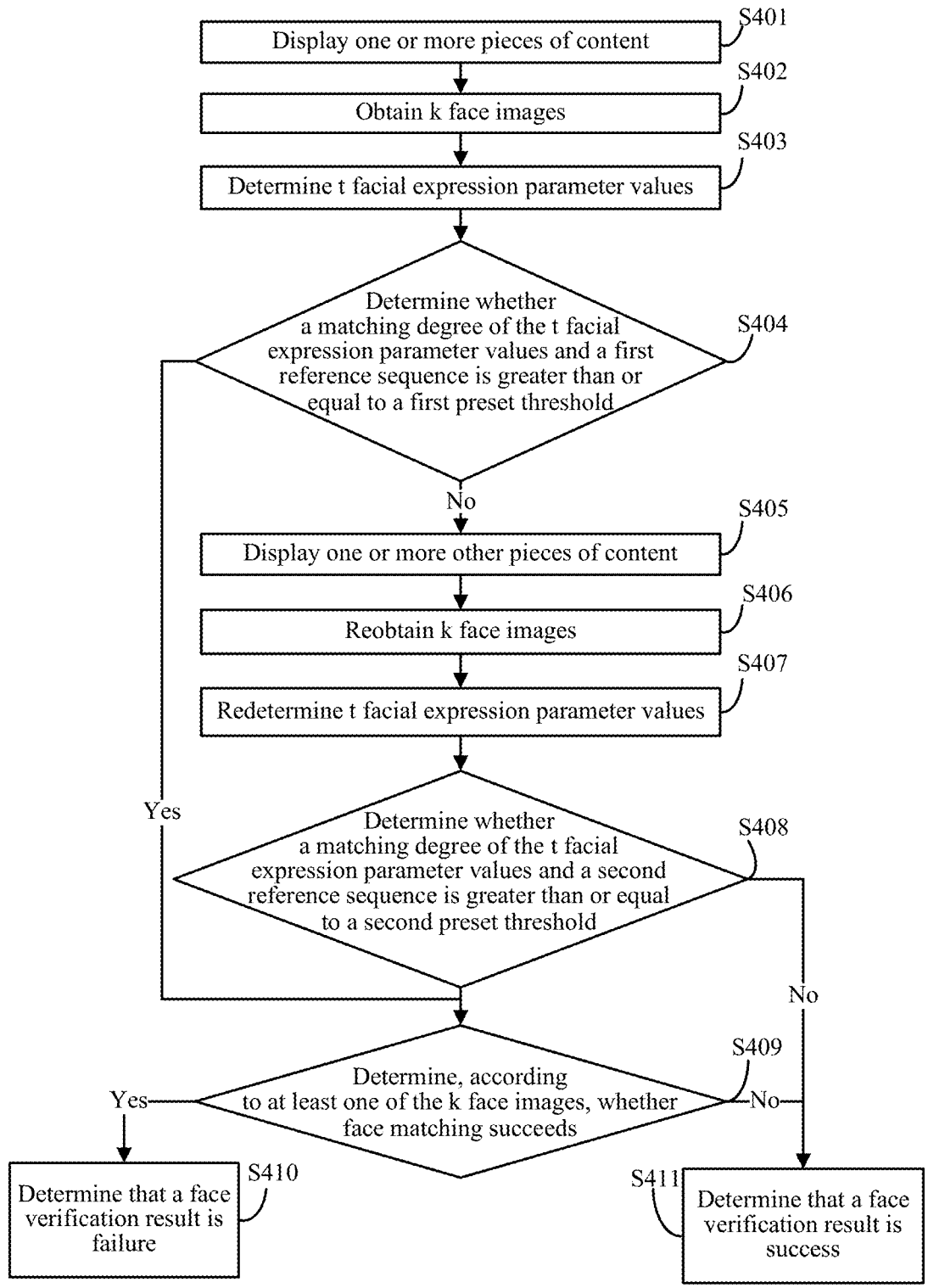
FIG. 4 is a schematic flowchart of a face verification method according to Embodiment 2 of the present invention.

Referring to FIG. 4, FIG. 4 is a schematic flowchart of a face verification method according to Embodiment 2 of the present invention. This embodiment of the present invention is substantially the same as Embodiment 1, except that, as shown in FIG. 4, the method in this embodiment includes the following specific steps in addition to step S401 to step S404 corresponding to step S201 to step S204 in Embodiment 1.

Step S405. The electronic device displays one or more other pieces of content on the display screen.

Step S406. The electronic device reobtains k face images by using the camera during display of the one or more other pieces of content.

Step S407. The electronic device redetermines t facial expression parameter values according to the reobtained k face images, where the facial expression parameter value includes at least one of a facial expression code value or a pupil relative value.

It should be noted that the facial expression parameter values in step S403 and step S407 may be the same, for example, both are facial expression code values, both are pupil relative values, or both include facial expression code values and pupil relative values; or the facial expression parameter values in step S403 and step S407 may be different, for example, the facial expression parameter values in step S403 are facial expression code values, and the facial expression parameter values in step S403 are pupil relative values. This is not limited in the present invention.

Step S408. The electronic device determines whether a matching degree of the reobtained t facial expression parameter values and a second preset reference sequence is not less than a second preset threshold; and if the matching degree of the t facial expression parameter values and the second preset reference sequence is not less than the second preset threshold, performs step S409; otherwise, performs step S411.

It should be noted that, in another optional embodiment, if the matching degree of the t facial expression parameter values and the second reference sequence is less than the second preset threshold, the electronic device may return to perform step S405, that is, to display the another piece of content and perform living body verification again. In this embodiment of the present invention, a quantity of times of living body verification may be adjusted according to an actual condition.

The second preset threshold and the first preset threshold may be the same or different. This is not limited in the present invention.

Step S409. The electronic device determines, according to at least one of the reobtained k face images, whether face matching succeeds; and if face matching succeeds, performs step S410, otherwise, performs step S411. It should be noted that, in another optional embodiment, if face matching fails, whether face matching succeeds is determined again according to at least one of the reobtained k face images, and a quantity of times of face matching may be adjusted according to an actual condition.

It should be noted that step S408 and step S409 may be performed at the same time, step S408 may be performed followed by step S409, or step S409 may be performed followed by step S408. There is no strict execution sequence between the two steps. This imposes no limitation on the present invention.

Step S410. The electronic device determines that a face matching result is success.

Step S411. The electronic device determines that a face verification result is failure.

In the embodiment shown in FIG. 4, if living body verification performed for the first time fails, there may be some objective reasons. For example, a captured face image is unclear, or an obtained face image is not real because same content is often displayed. Therefore, to prevent incorrect determining, an electronic device displays one or more other pieces of content on a display screen, and performs living body verification by using a same method again. It should be noted that a quantity of times of repeatedly performing living body verification by the electronic device in this manner may be preset and adjusted according to an actual condition. This is not limited in the present invention.

Figure 5:
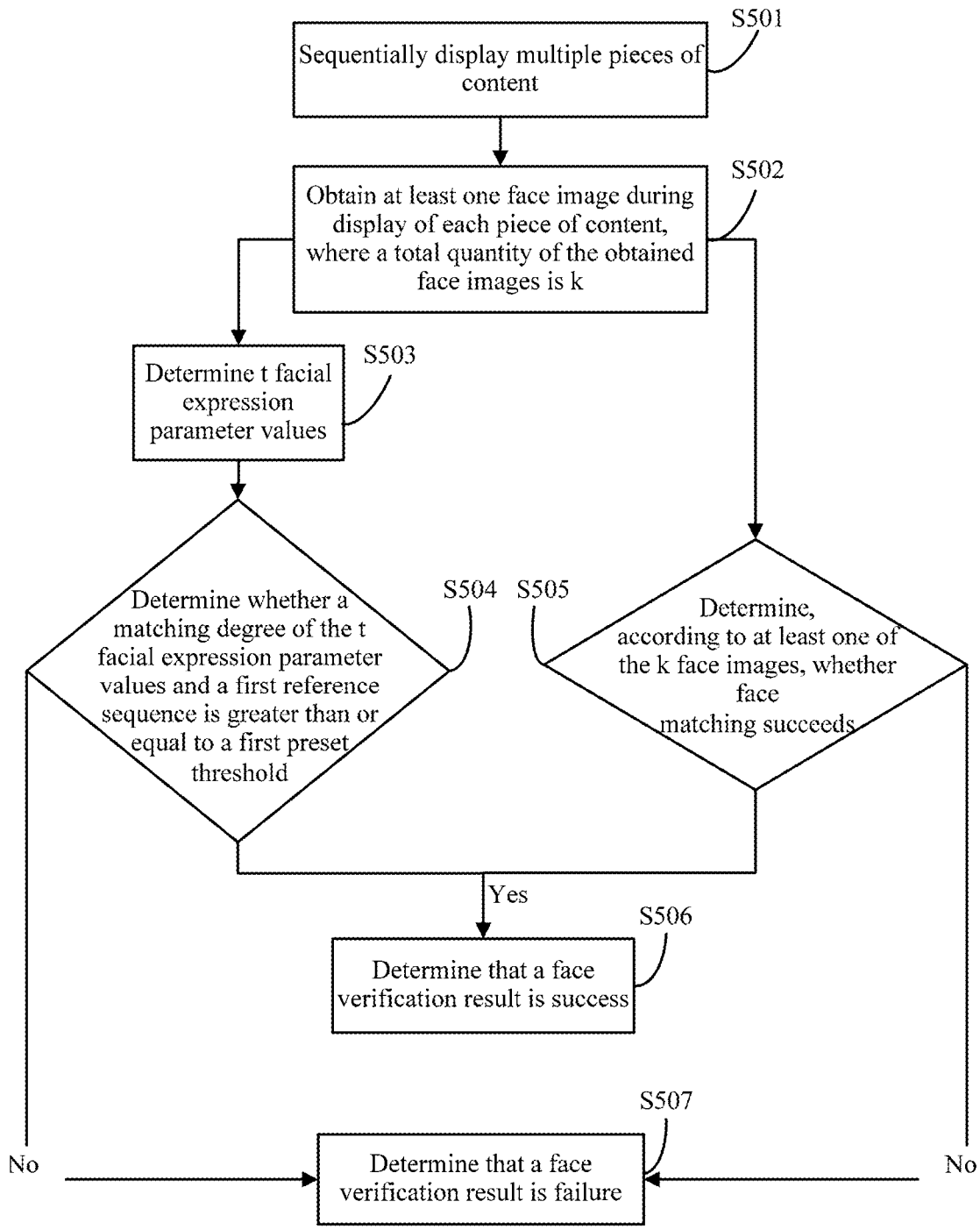
FIG. 5 is a schematic flowchart of a face verification method according to Embodiment 3 of the present invention.

Referring to FIG. 5, FIG. 5 is a schematic flowchart of a face verification method according to Embodiment 3 of the present invention. The face verification method provided in this embodiment of the present invention is applied to an electronic device including a display screen and a camera. As shown in FIG. 5, the method may include the following steps.

Step S501. The electronic device sequentially displays multiple pieces of content on the display screen, where the content includes a character, a picture, or a video. The multiple pieces of content sequentially displayed are a set of prestored content, there is a sequence between all pieces of content, and the content is sequentially displayed on the display screen according to the sequence.

Specifically, when the electronic device receives a face verification instruction, the electronic device may sequentially display the multiple pieces of content on the display screen of the electronic device. A smartphone is used as an example of the electronic device. For example, when the smartphone is being unlocked, it may be considered that a face verification instruction is received. An access control device is used as an example of the electronic device. For example, when the access control device is performing authentication, it may be considered that a face verification instruction is received.

The electronic device may prestore multiple sets of content, each set of content includes multiple pieces of content, each set of content is corresponding to a reference sequence, and when receiving the face verification instruction, the electronic device may randomly obtain one set of content from the prestored multiple sets of content, and sequentially display this set of content on the display screen, where one piece of content is played each time.

If the content is a character, that the electronic device sequentially displays multiple pieces of content on the display screen of the electronic device may be specifically: sequentially displaying texts on the display screen according to a sequence of all the texts in this set, where a time interval at which two texts are displayed is preset. Specifically, the electronic device may display a question including characters, or may display characters with uneven clarity. It should be noted that, if the content is a character, and a quantity of characters displayed on the display screen each time may not be limited.

If the content is a picture, that the electronic device sequentially displays multiple pieces of content on the display screen of the electronic device may be specifically: sequentially displaying pictures on the display screen according to a sequence of all the pictures in this set, where a time interval at which two pictures are displayed is preset.

If the content is a video, sequentially displaying multiple pieces of content on the display screen may be specifically: sequentially displaying video clips on the display screen according to a sequence of all the video clips in this set.

In this embodiment of the present invention, a facial expression change and a pupil change provided by a user with respect to multiple pieces of content are captured by displaying the content, and living body verification is performed according to the facial expression change and/or the pupil change. In this way, deliberately prompting the user is avoided, interaction with the user becomes more natural, and user experience is enhanced.

It should be noted that, in another optional embodiment, displaying at least two pieces of content on the display screen may be replaced by playing at least two audio clips by using an voice output unit, so as to capture a facial expression change and a pupil change provided by a user with respect to the audio clips, and perform living body verification according to the facial expression change and/or the pupil change.

Step S502. The electronic device obtains at least one face image during display of each piece of content, where a total quantity of the obtained face images is k.

If a quantity of the multiple pieces of content sequentially displayed by the electronic device on the display screen of the electronic device may be k, the electronic device needs to obtain only one face image during display of each piece of content.

It should be noted that, the face images obtained by the electronic device during display of each piece of content may be the same or different. This is not limited in the present invention.

Step S503. The electronic device determines t facial expression parameter values according to obtained k face images.

Specifically, the electronic device determines a facial expression parameter value according to a display sequence of each piece of content and according to at least one of the face images obtained during display of each piece of the content to obtain t facial expression parameter values, where the facial expression parameter value includes at least one of a facial expression code value or a pupil relative value.

Because at least one face image is obtained according to each piece of content, and there is a same processing procedure in which how the electronic device determines a facial expression parameter value according to at least one face image obtained during display of each piece of content, in this embodiment of the present invention, an example in which a facial expression parameter value is determined according to a face image obtained during display of the first piece of content is used for related description, and a processing procedure performed according to another piece of content is similar. Details are not repeated herein.

In an optional implementation, the electronic device may select a clearest face image from at least one face image obtained during display of the first piece of content, and determine a facial expression parameter value according to the selected face image.

In another optional implementation, the electronic device may alternatively obtain at least two face images from at least one face image obtained during display of the first piece of content, then obtain a facial expression parameter value of each face image, compare the obtained facial expression parameter values, and select a facial expression parameter value that is obtained most frequently. It is assumed that the electronic device obtains five facial expression parameter values, and the five facial expression parameter values are (3, 3, 3, 2, 4). The electronic device may determine that the facial expression parameter value is 3.

It should be noted that, for how the electronic device determines a facial expression parameter value according to a face image obtained during display of one piece of content, refer to the embodiment shown in FIG. 2, and details are not repeated herein.

Step S504. The electronic device determines whether a matching degree of the determined t facial expression parameter values and a first preset reference sequence is not less than a first preset threshold.

Step S505. The electronic device determines, according to at least one of the obtained k face images, whether face matching succeeds.

It should be noted that step S504 and step S505 may be performed at the same time, step S504 may be performed followed by step S505, or step S505 may be performed followed by step S504. There is no strict execution sequence between the two steps. This imposes no limitation on the present invention.

Step S506. If the matching degree of the determined t facial expression parameter values and the first preset reference sequence is not less than the first preset threshold, and a face matching result obtained according to at least one of the obtained k face images is success, the electronic device determines that a face verification result is success.

Step S507. If the matching degree of the determined t facial expression parameter values and the first reference sequence is less than the first preset threshold and/or the face matching result obtained according to the at least one of the obtained k face images is failure, determine that a face verification result is failure.

In the embodiment shown in FIG. 5, an electronic device captures, by sequentially displaying multiple pieces of content on a display screen, a facial expression change and a pupil change provided by a user with respect to the set of content, to perform living body verification. Compared with the prior art in which living body verification is performed by blinking according to a prompt or performed by means of single interaction, and compared with the technical solution provided in the embodiment shown in FIG. 2, this embodiment of the present invention further increases a difficulty of living body verification, so as to reduce a possibility of an attack resulting from a photo, a video, 3D printing, or another technology. In addition, during living body verification, there is no need to deliberately prompt the user, interaction with the user becomes more natural, and user experience is enhanced.

Figure 6:
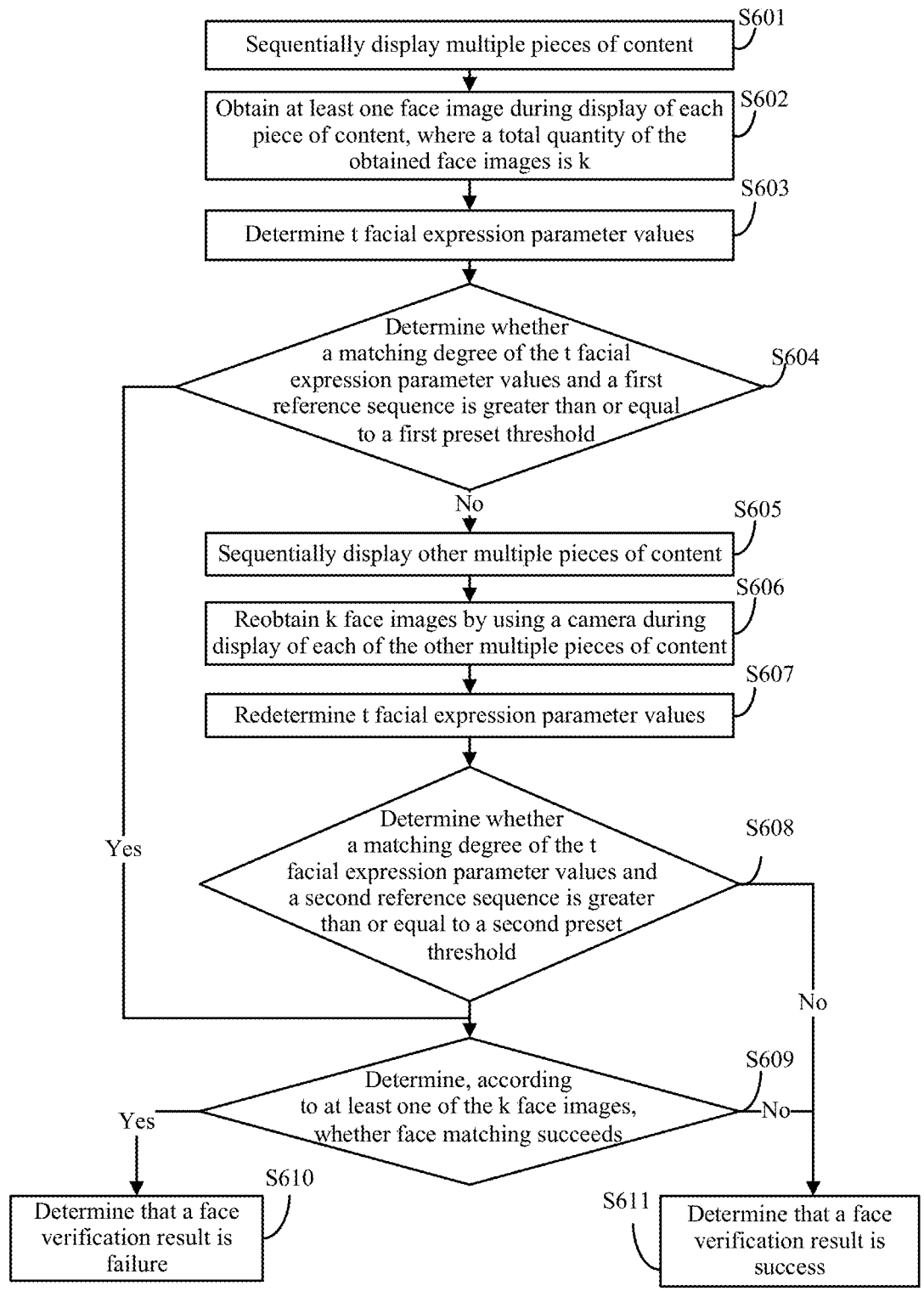
FIG. 6 is a schematic flowchart of a face verification method according to Embodiment 4 of the present invention.

Referring to FIG. 6, FIG. 6 is a schematic flowchart of a face verification method according to Embodiment 4 of the present invention. This embodiment of the present invention is substantially the same as Embodiment 3, except that, as shown in FIG. 6, the method in this embodiment further includes the following specific steps in addition to step S601 to step S604 corresponding to step S501 to step S504 in Embodiment 3.

Step S605. The electronic device sequentially displays other multiple pieces of content on the display screen.

Step S606. The electronic device reobtains k face images by using the camera during display of each of the other multiple pieces of content.

Step S607. The electronic device redetermines t facial expression parameter values according to the reobtained k face images.

It should be noted that the facial expression parameter values in step S603 and step S607 may be the same, for example, both are facial expression code values, both are pupil relative values, or both include facial expression code values and pupil relative values; or the facial expression parameter values in step S603 and step S607 may be different, for example, the facial expression parameter values in step S603 are facial expression code values, and the facial expression parameter values in step S603 are pupil relative values. This is not limited in the present invention.

Step S608. The electronic device determines whether a matching degree of the redetermined t facial expression parameter values and a second preset reference sequence is not less than a second preset threshold; and if the matching degree of the redetermined t facial expression parameter values and the second preset reference sequence is not less than the second preset threshold, performs step S609; otherwise, performs step S611.

It should be noted that, in another optional embodiment, if the matching degree of the redetermined t facial expression parameter values and the second reference sequence is less than the second preset threshold, the electronic device may return to perform step S605, that is, to display the other multiple pieces of content and perform living body verification again. In this embodiment of the present invention, a quantity of times of living body verification may be adjusted according to an actual condition.

The second preset threshold and the first preset threshold may be the same or different. This is not limited in the present invention.

Step S609. The electronic device determines, according to at least one of the reobtained k face images, whether face matching succeeds; and if face matching succeeds, performs step S610, otherwise, performs step S611. It should be noted that, in another optional embodiment, if face matching fails, whether face matching succeeds is determined again according to at least one of the reobtained k face images, and a quantity of times of face matching may be adjusted according to an actual condition.

It should be noted that step S608 and step S609 may be performed at the same time, step S608 may be performed followed by step S609, or step S609 may be performed followed by step S608. There is no strict execution sequence between the two steps. This imposes no limitation on the present invention.

Step S610. The electronic device determines that a face matching result is success.

Step S611. The electronic device determines that a face verification result is success.

In the embodiment shown in FIG. 6, if living body verification performed for the first time fails, there may be some objective reasons. For example, a captured face image is unclear, or an obtained face image is not real because same content is often displayed. Therefore, to prevent incorrect determining, an electronic device displays other multiple pieces of content on a display screen, and performs living body verification by using a same method again. It should be noted that a quantity of times of repeatedly performing living body verification by the electronic device in this manner may be preset and adjusted according to an actual condition. This is not limited in the present invention.

Figure 7:
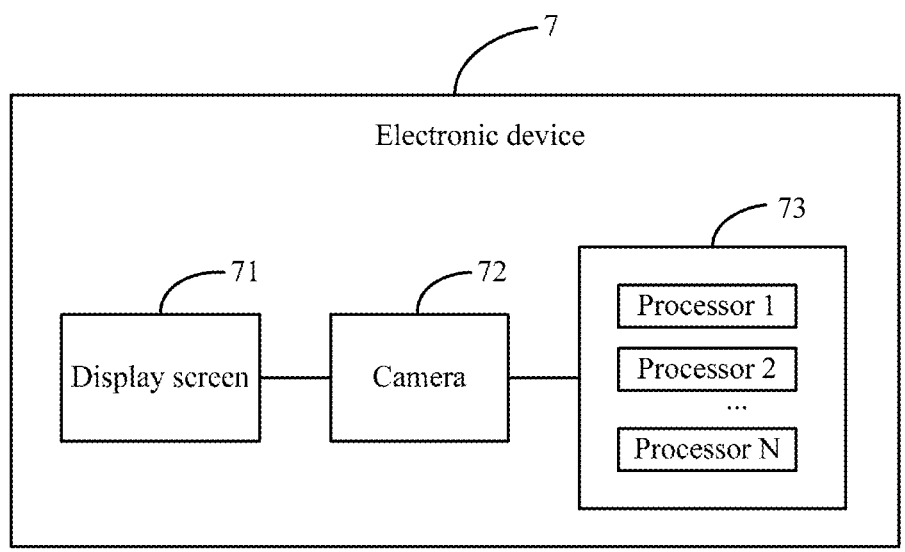
FIG. 7 is a schematic structural diagram of an electronic device according to an embodiment of the present invention.

Referring to FIG. 7, FIG. 7 is a schematic structural diagram of an electronic device according to an embodiment of the present invention. As shown in FIG. 7, the electronic device 7 may include at least a display screen 71, a camera 72, and at least one processor 73.

The display screen 71 displays one or more pieces of content, where the content includes a character, a picture, or a video. The camera 72 obtains k face images during display of the content, where k is an integer not less than 2. The at least one processor 73 is configured to: determine t facial expression parameter values according to the obtained k face images, where the facial expression parameter value includes at least one of a facial expression code value or a pupil relative value, t is an integer not less than 2, and t≤k; and if a matching degree of the determined t facial expression parameter values and a first preset reference sequence is not less than a first preset threshold, and a face matching result obtained according to at least one of the obtained k face images is success, determine that a face verification result is success.

It can be understood that, in this implementation, functions of the function modules of the electronic device 7 can be specifically implemented according to the methods in the method embodiments shown in FIG. 2 to FIG. 6, and may be corresponding to the related descriptions of FIG. 2 to FIG. 6. Details are not described again herein.

It should be noted that, in the foregoing embodiments, the description of each embodiment has respective focuses. For a part that is not described in detail in an embodiment, reference may be made to related descriptions in other embodiments. In addition, a person skilled in the art should also appreciate that all the embodiments described in the specification are examples of embodiments, and the related actions and modules are not necessarily mandatory to the embodiments of the present invention.

A sequence of the steps of the method in the embodiments of the present invention may be adjusted, and certain steps may also be merged or removed according to an actual need.

Merging, division, and removing may be performed on the modules in the embodiments of the present invention according to an actual need.

The units of the embodiments of the present invention may be executed by a universal integrated circuit, such as a CPU (Central Processing Unit, central processing unit) or an ASIC (Application Specific Integrated Circuit, application-specific integrated circuit).

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A face verification method, applied to an electronic device comprising a display screen and a camera, wherein the method comprises:

displaying one or more pieces of content on the display screen, wherein the one or more pieces of content comprises one or more of a character, a picture, or a video;

obtaining k face images by using the camera during display of the one or more pieces of content, wherein k is an integer not less than 2;

determining t facial expression parameter values according to the obtained k face images, wherein the facial expression parameter values comprises encoded values assigned for at least one of a facial expression code value or a pupil relative value, wherein the facial expression code value or the pupil relative value is distinctly mapped to a human facial expression, wherein t is an integer not less than 2, and t<=k; and if a matching degree of the determined the t facial expression parameter values and a first preset reference sequence is not less than a first preset threshold, wherein the matching degree determination is done using an eigenvector method, wherein geometric attributes from the t facial expression parameter values are determined based on the encoded values of the human facial expression and geometric characteristic quantities of the geometric attributes derived from the human facial expression are computed, and a face matching result obtained according to at least one of the obtained k face images is success, determining that a face verification result is success.

2. The method according to claim 1, wherein the method further comprises:

displaying one or more other pieces of content on the display screen if the matching degree of the determined t facial expression parameter values and the first reference sequence is less than the first preset threshold;
reobtaining k face images by using the camera during display of the one or more other pieces of content;
re-determining t facial expression parameter values according to the reobtained k face images; and
if a matching degree of the re-determined t facial expression parameter values and a second preset reference sequence is not less than a second preset threshold, and a face matching result obtained according to at least one of the reobtained k face images is success, determining that a face verification result is success.

3. The method according to claim 1, wherein the method further comprises:
if the matching degree of the determined t facial expression parameter values and the first reference sequence is less than the first preset threshold or the face matching result obtained according to the at least one of the obtained k face images is failure, determining that a face verification result is failure.

4. The method according to claim 2, wherein the method further comprises:
if the matching degree of the re-determined t facial expression parameter values and the second reference sequence is less than the second preset threshold or the face matching result obtained according to the at least one of the reobtained k face images is failure, determining that a face verification result is failure.

5. The method according to claim 1, wherein
if one or more pieces of content are simultaneously displayed on the display screen, the obtaining k face images by using the camera during display of the one or more pieces of content comprises:
obtaining, according to a preset interval, the k face images after the one or more pieces of content start being displayed.

6. The method according to claim 1, wherein
if multiple pieces of content are sequentially displayed on the display screen, the obtaining k face images by using the camera during display of the multiple pieces of content comprises:
obtaining at least one face image during display of each piece of content, wherein a total quantity of the obtained face images is k.

7. The method according to claim 1, wherein
the one piece of content is one piece of content randomly selected from multiple pieces of content stored in the electronic device, wherein each piece of content corresponds to a reference sequence, or
the multiple pieces of content are one set of content randomly selected from multiple sets of content stored in the electronic device, wherein each set of content corresponds to a reference sequence.

8. An electronic device, wherein the electronic device comprises:
a display screen, configured to display one or more pieces of content, wherein the one or more pieces of content comprises one or more of a character, a picture, or a video;
a camera, configured to obtain k face images during display of the content, wherein k is an integer not less than 2;
at least one processor; and
a non-transitory computer-readable storage medium coupled to the at least one processor and storing programming instructions for execution by the at least one processor, the programming instructions instruct the at least one processor to:
determine t facial expression parameter values according to the obtained k face images, wherein the facial expression parameter value comprises encoded values assigned for at least one of a facial expression code value or a pupil relative value, wherein the facial expression code value or the pupil relative value is distinctly mapped to a human facial expression, wherein t is an integer not less than 2, and t<=k; and
if a matching degree of the determined t facial expression parameter values and a first preset reference sequence is not less than a first preset threshold, wherein the matching degree determination is done using an eigenvector method, wherein geometric attributes from the t facial expression parameter values are determined based on the encoded values of the human facial expression and geometric characteristic quantities of the geometric attributes derived from the human facial expression are computed, and a face matching result obtained according to at least one of the obtained k face images is success, determine that a face verification result is success.

9. The electronic device according to claim 8, wherein:
the display screen is further configured to:
display one or more other pieces of content if the matching degree of the determined t facial expression parameter values and the first reference sequence is less than the first preset threshold;
the camera is further configured to:
reobtain k face images during display of the one or more other pieces of content; and
the programming instructions further instruct the at least one processor to:
re-determine t facial expression parameter values according to the reobtained k face images; and if a matching degree of the re-determined t facial expression parameter values and a second preset reference sequence is not less than a second preset threshold, and a face matching result obtained according to at least one of the reobtained k face images is success, determine that a face verification result is success.

10. The electronic device according to claim 8, wherein the programming instructions further instruct the at least one processor to:
if the matching degree of the determined t facial expression parameter values and the first reference sequence is less than the first preset threshold or the face matching result obtained according to the at least one of the obtained k face images is failure, determine that a face verification result is failure.

11. The electronic device according to claim 9, wherein the programming instructions further instruct the at least one processor to:
if the matching degree of the re-determined t facial expression parameter values and the second reference sequence is less than the second preset threshold or the face matching result obtained according to the at least one of the reobtained k face images is failure, determine that a face verification result is failure.

12. The electronic device according to claim 8, wherein
if one or more pieces of content are simultaneously displayed on the display screen, the camera is configured to:

obtain, according to a preset interval, the k face images after the one or more pieces of content start being displayed.

13. The electronic device according to claim 8, wherein if multiple pieces of content are sequentially displayed on the display screen, the camera is configured to:
obtain at least one face image during display of each piece of content, wherein a total quantity of the obtained face images is k.

14. The electronic device according to claim 8, wherein
the one piece of content is one piece of content randomly selected from multiple pieces of content stored in the electronic device, wherein each piece of content corresponds to a reference sequence, or
the multiple pieces of content are one set of content randomly selected from multiple sets of content stored in the electronic device, wherein each set of content corresponds to a reference sequence.

15. A non-transitory computer readable storage medium storing one or more programs,
wherein the one or more programs comprise programming instructions, wherein when executed by an electronic device, the programming instructions instruct the electronic device to implement operations comprising:
displaying one or more pieces of content on a display screen, wherein the one or more pieces of content comprises one or more of a character, a picture, or a video;
obtaining k face images by using a camera during display of the one or more pieces of content, wherein k is an integer not less than 2;
determining t facial expression parameter values according to the obtained k face images, wherein the facial expression parameter value comprises encoded values assigned for at least one of a facial expression code value or a pupil relative value, wherein the facial expression code value or the pupil relative value is distinctly mapped to a human facial expression, wherein t is an integer not less than 2, and t<=k; and
if a matching degree of the determined t facial expression parameter values and a first preset reference sequence is not less than a first preset threshold, wherein the matching degree determination is done using an eigenvector method, wherein geometric attributes from the t facial expression parameter values are determined based on the encoded values of the human facial expression and geometric characteristic quantities of the geometric attributes derived from the human facial expression are computed, and a face matching result obtained according to at least one of the obtained k face images is success, determining that a face verification result is success.

16. The non-transitory computer readable medium according to claim 15, wherein the operations further comprise:
displaying one or more other pieces of content on the display screen if the matching degree of the determined t facial expression parameter values and the first reference sequence is less than the first preset threshold;
reobtaining k face images by using the camera during display of the one or more other pieces of content;
re-determining t facial expression parameter values according to the reobtained k face images; and
if a matching degree of the re-determined t facial expression parameter values and a second preset reference sequence is not less than a second preset threshold, and a face matching result obtained according to at least one of the reobtained k face images is success, determining that a face verification result is success.

17. The non-transitory computer readable medium according to claim 15, wherein the operations further comprise:
if the matching degree of the determined t facial expression parameter values and the first reference sequence is less than the first preset threshold or the face matching result obtained according to the at least one of the obtained k face images is failure, determining that a face verification result is failure.

18. The non-transitory computer readable medium according to claim 16, wherein the operations further comprise:
if the matching degree of the re-determined t facial expression parameter values and the second reference sequence is less than the second preset threshold or the face matching result obtained according to the at least one of the reobtained k face images is failure, determining that a face verification result is failure.

19. The non-transitory computer readable medium according to claim 15, wherein the operations further comprise:
if one or more pieces of content are simultaneously displayed on the display screen, the obtaining k face images by using the camera during display of the one or more pieces of content comprises:
obtaining, according to a preset interval, the k face images after the one or more pieces of content start being displayed.

20. The non-transitory computer readable medium according to claim 15, wherein the operations further comprise:
if multiple pieces of content are sequentially displayed on the display screen, the obtaining k face images by using the camera during display of the multiple pieces of content comprises:
obtaining at least one face image during display of each piece of content, wherein a total quantity of the obtained face images is k.

* * * * *